Figure 1:
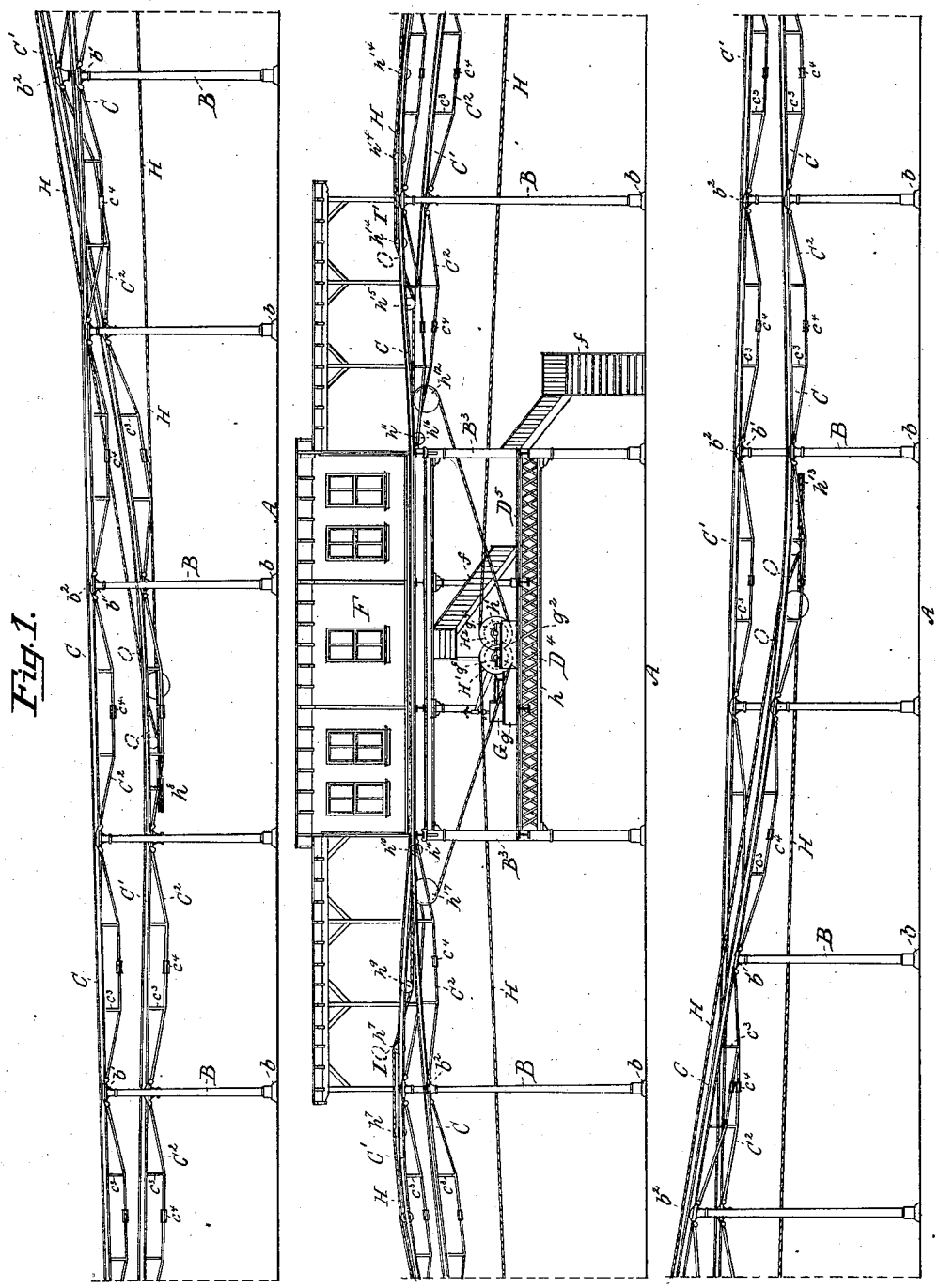

(No Model.) 8 Sheets—Sheet 1.

LA MARCUS A. THOMPSON.
ELEVATED GRAVITY AND CABLE RAILROAD.

No. 367,252. Patented July 26, 1887.

WITNESSES:
Hermann Bormann
Thomas M. Smith.

INVENTOR.
La. Marcus A. Thompson,
by J. Walter Douglass.
Atty.

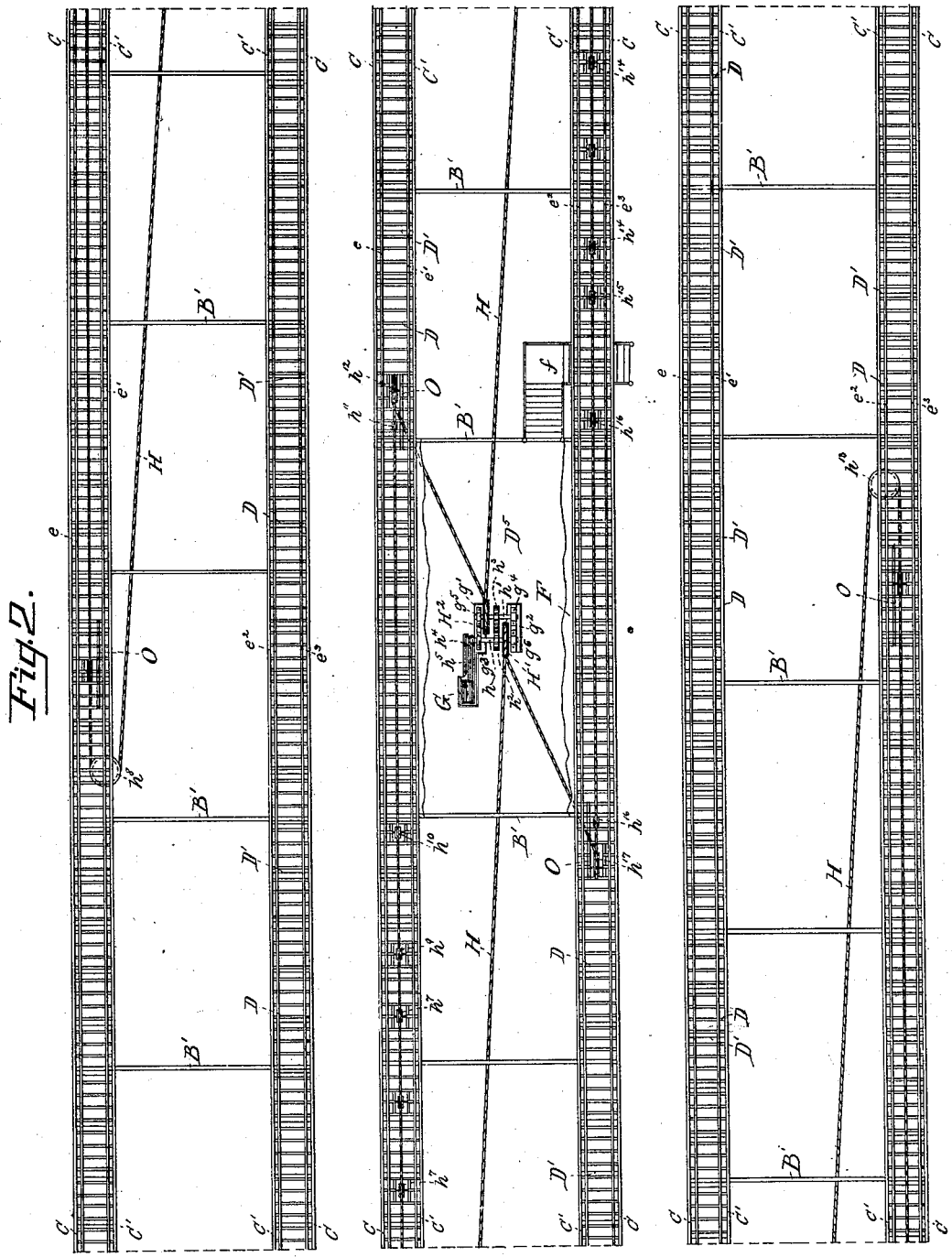

(No Model.) 8 Sheets—Sheet 3.
LA MARCUS A. THOMPSON.
ELEVATED GRAVITY AND CABLE RAILROAD.
No. 367,252. Patented July 26, 1887.
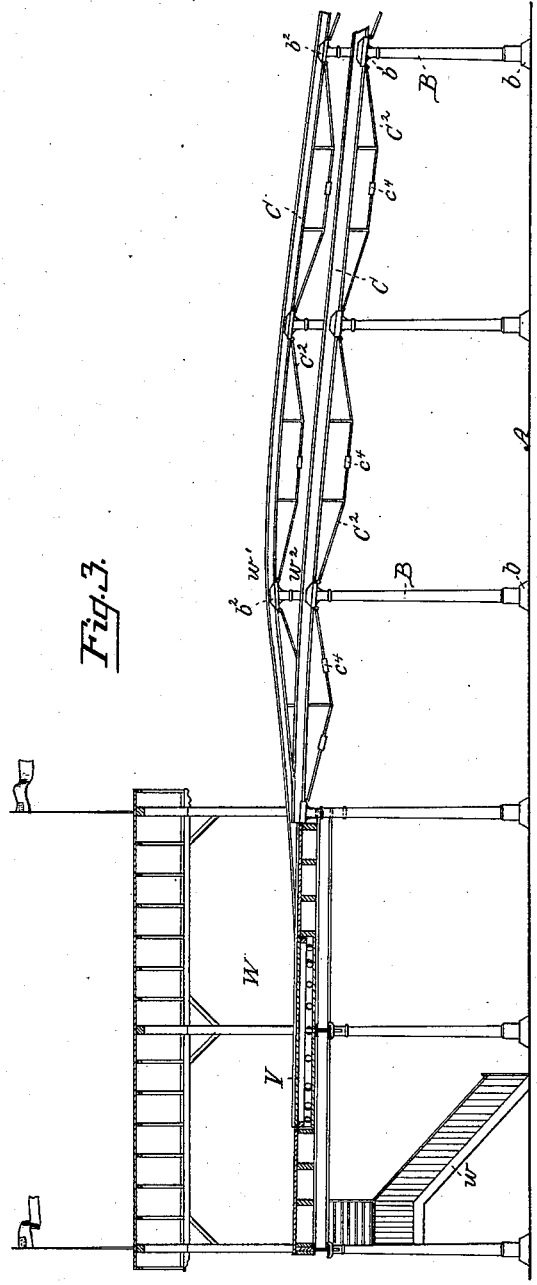
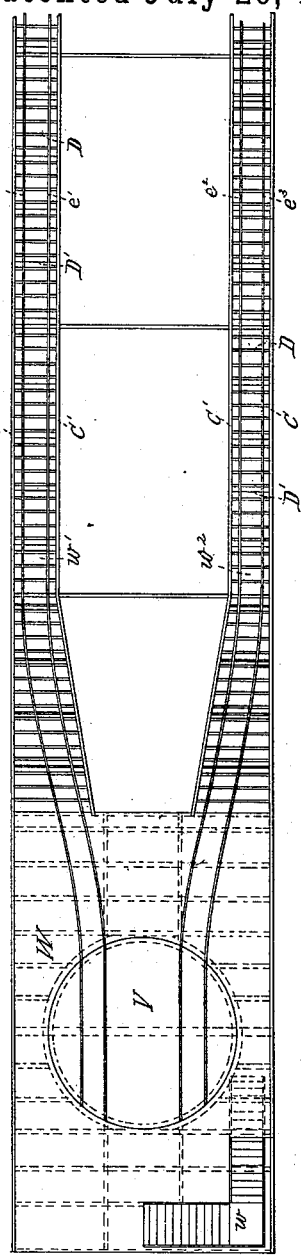
WITNESSES:
Hermann Bormann
Thomas M. Smith.
INVENTOR.
La Marcus A. Thompson,
by J. Walter Douglas.
Atty.

(No Model.) 8 Sheets—Sheet 4.
LA MARCUS A. THOMPSON.
ELEVATED GRAVITY AND CABLE RAILROAD.
No. 367,252. Patented July 26, 1887.
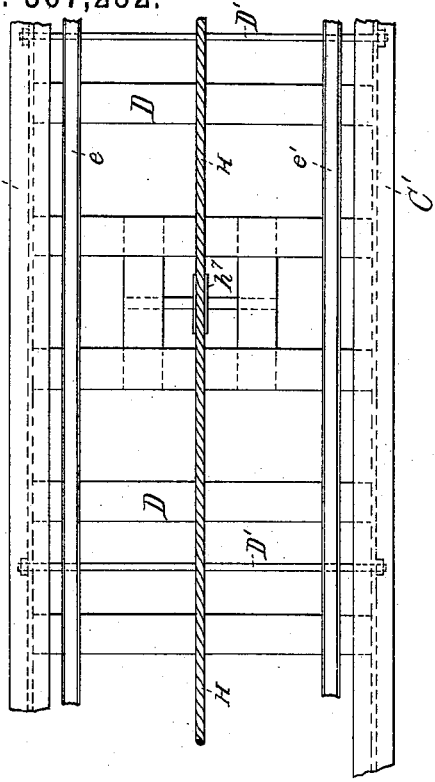
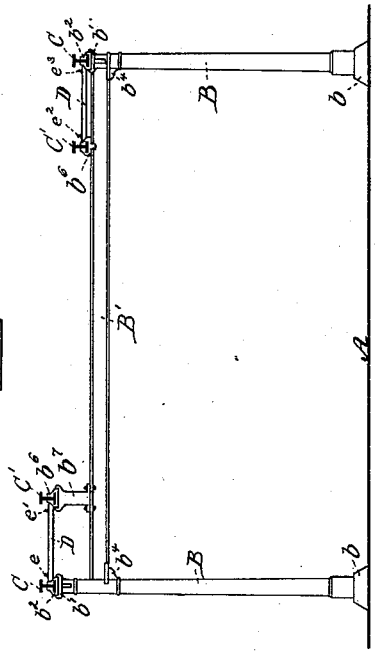
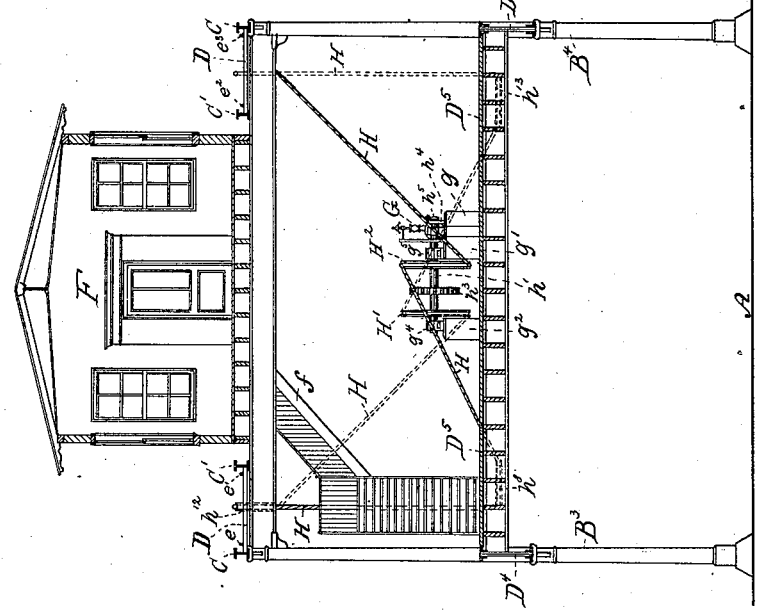
WITNESSES:
Hermann Bormann.
Thomas M. Smith.
INVENTOR.
La Marcus A. Thompson.
by J. Walter Douglass.
Atty.

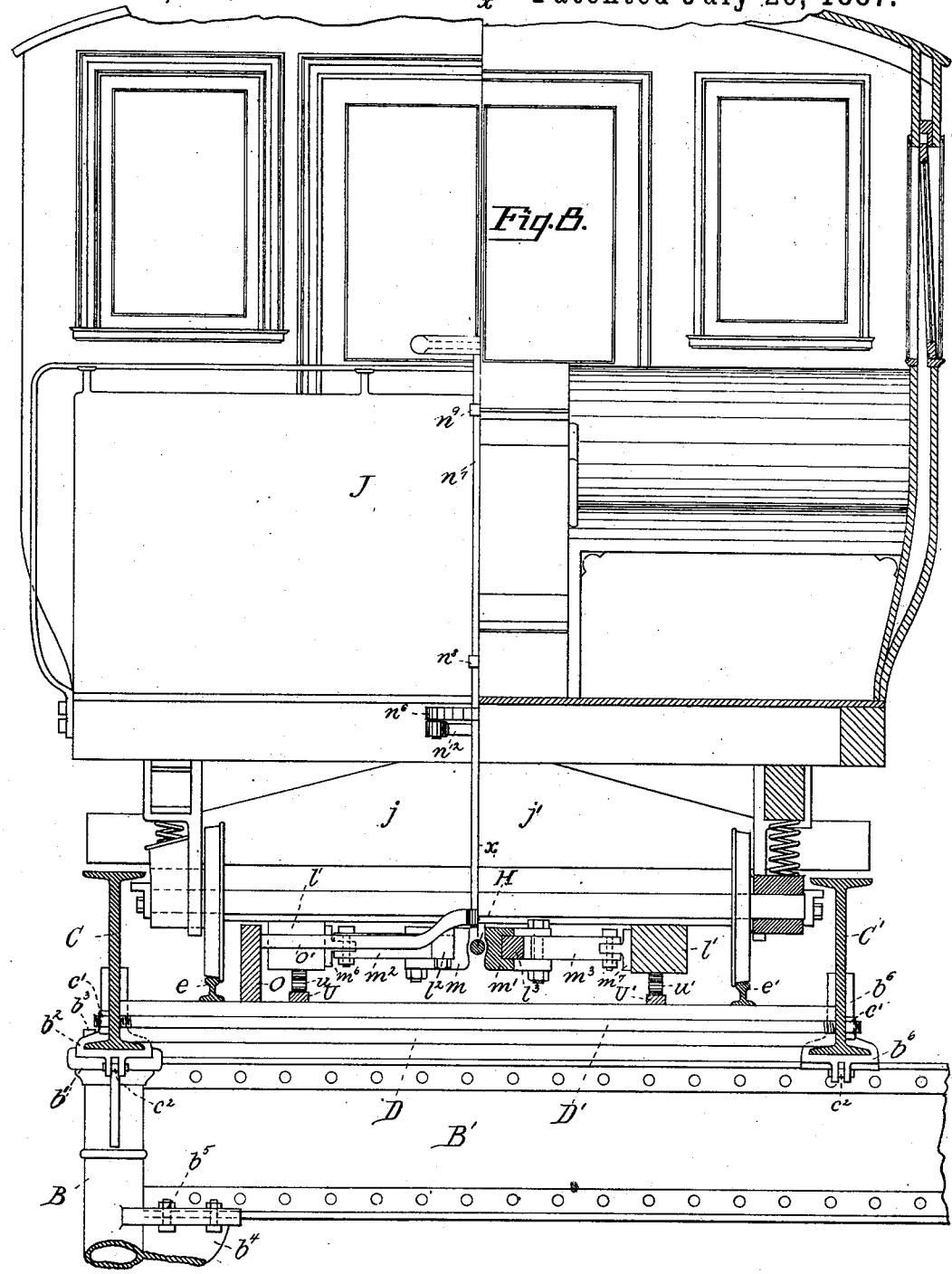

(No Model.) 8 Sheets—Sheet 6.
LA MARCUS A. THOMPSON.
ELEVATED GRAVITY AND CABLE RAILROAD.
No. 367,252. Patented July 26, 1887.
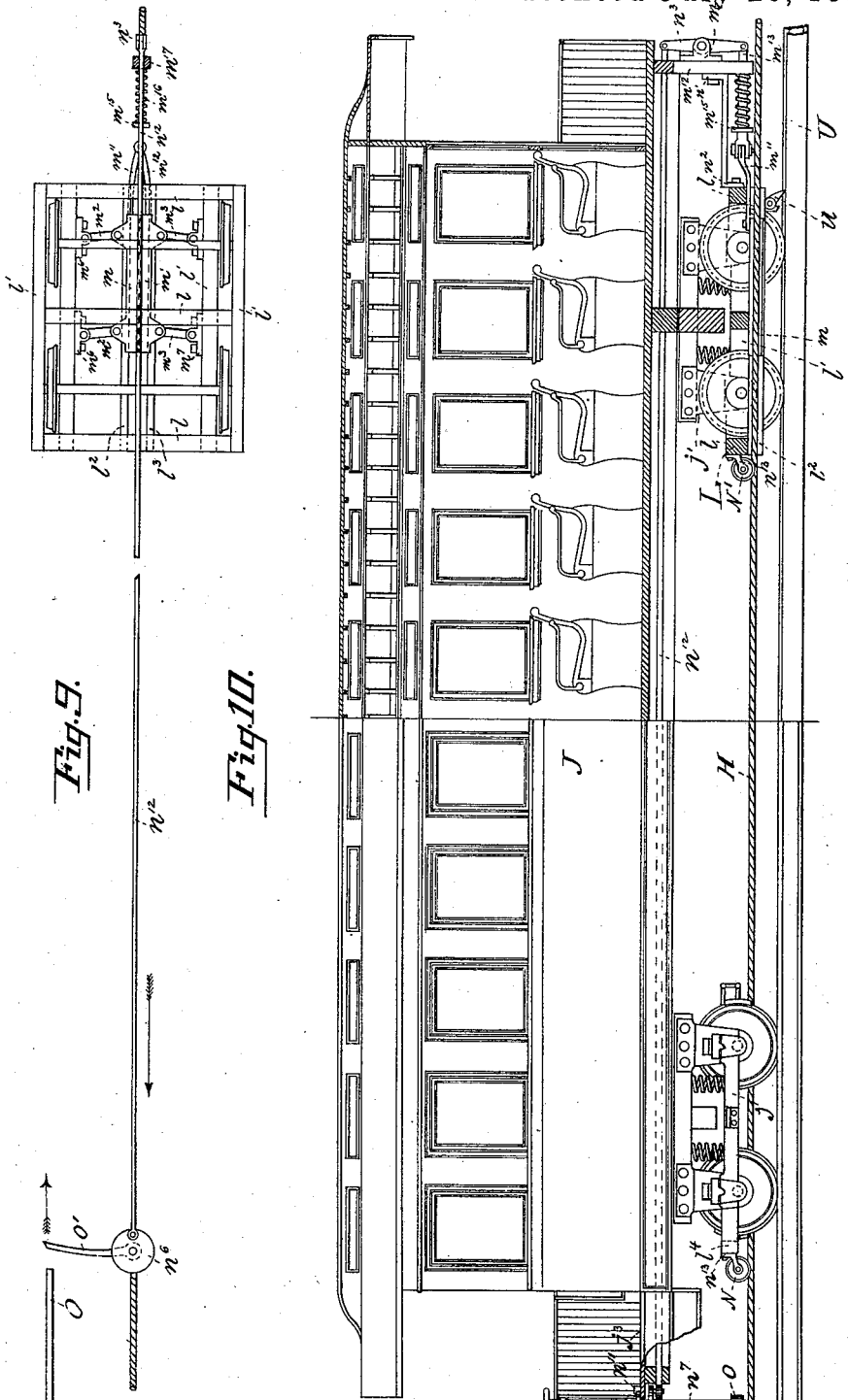
WITNESSES:
Hermann Bormann
Thomas M. Smith
INVENTOR.
La Marcus A. Thompson,
by J. Walter Douglass
Atty.

(No Model.) 8 Sheets—Sheet 7.
LA MARCUS A. THOMPSON.
ELEVATED GRAVITY AND CABLE RAILROAD.
No. 367,252. Patented July 26, 1887.
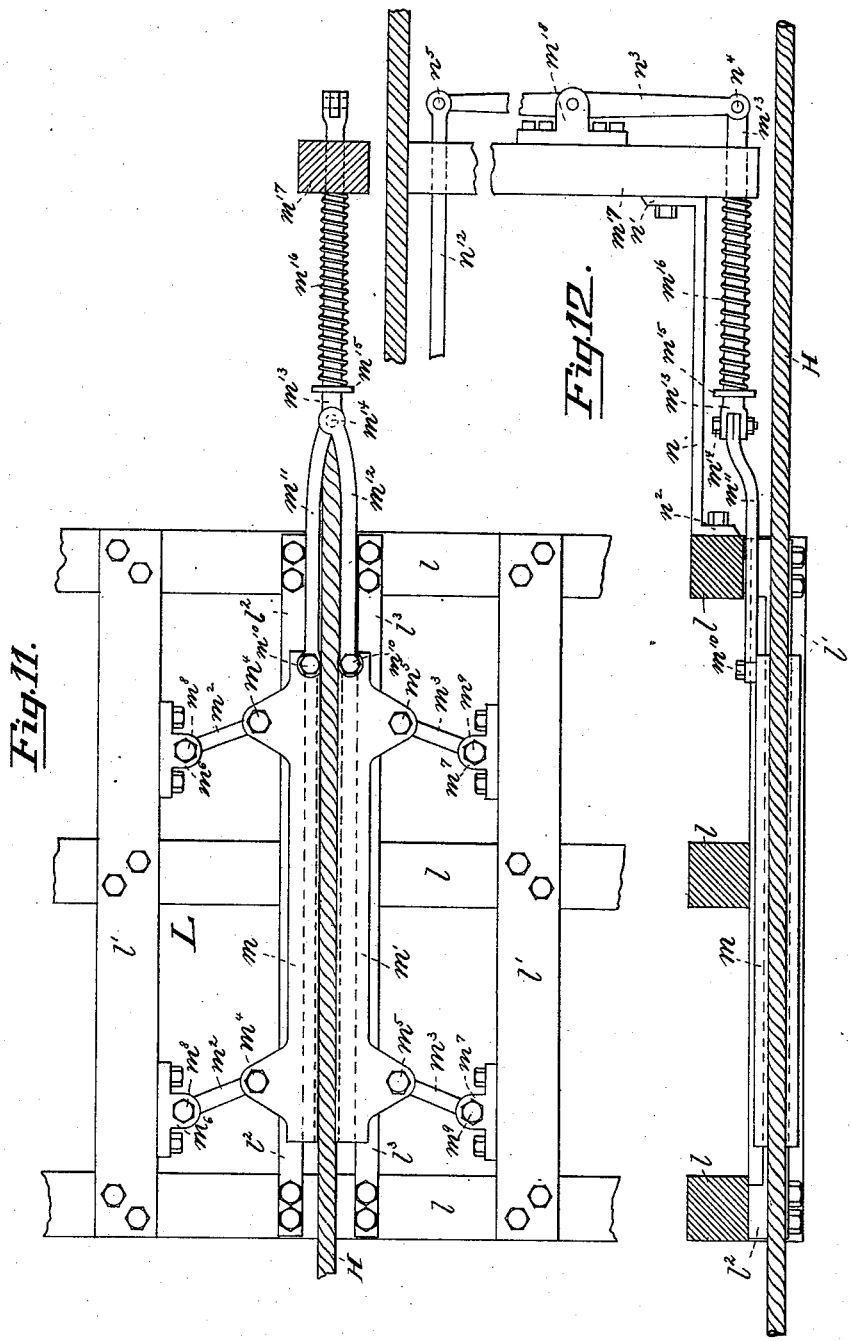
WITNESSES:
INVENTOR.

(No Model.) 8 Sheets—Sheet 8.

LA MARCUS A. THOMPSON.
ELEVATED GRAVITY AND CABLE RAILROAD.

No. 367,252. Patented July 26, 1887.

WITNESSES=
Hermann Bormann.
Thomas M. Smith.

INVENTOR.
La. Marcus A. Thompson.
by J. Walter Douglass
Atty

UNITED STATES PATENT OFFICE.

LA MARCUS A. THOMPSON, OF PHILADELPHIA, PENNSYLVANIA.

ELEVATED GRAVITY AND CABLE RAILROAD.

SPECIFICATION forming part of Letters Patent No. 367,252, dated July 26, 1887.

Application filed March 21, 1887. Serial No. 231,638. (No model.)

*To all whom it may concern:*

Be it known that I, LA MARCUS A. THOMPSON, of the city and county of Philadelphia, in the State of Pennsylvania, have invented certain new and useful Improvements in Elevated Gravity and Cable Railroads, of which the following is a specification.

My invention relates to an elevated railway designed for use in cities, parks, and at seaside and other resorts for the conveyance of persons from one point to another and in cars or coaches of suitable construction, propelled alternately over the descending and ascending planes thereof by means of gravity and cables actuated by suitable motive power.

The object of my invention is to provide an elevated structure of iron, wood, or other material, of any desired length, having a series of descending and ascending longitudinal planes, whereupon a car traveling over rails secured to the road-bed is conveyed by gravity from the summit of an elevated starting-station to the foot of that plane, where the car, having a gripping device operating either automatically or otherwise, comes into contact with a cable and is drawn upward to the passenger-station at or just beyond the summit of the ascending plane and the car released automatically or otherwise from the cable at the summit only, to be conveyed by gravity in a downward direction from the station over the descending plane to the next ascending plane in contact with another cable, and so on, in regular succession, along the course of any desired length the car or cars may be conveyed and propelled—that is to say, constructing an elevated undulating railroad-course, so that a car may be conveyed alternately by gravity and propelled alternately by a cable actuated by suitable motive power from power-furnishing stations located at suitable distances apart along the road and connected with the elevated structure, thereby dispensing with locomotive-engines entirely and the attending dangers and annoyances arising from their use on overhead railways, and with the cost of construction and expense of operating and maintaining such railroads appreciably lessened.

My invention consists, first, in providing an elevated railway of simple construction, while at the same time strong and durable, suitable for conveying cars or coaches by gravity and propelling them by cable motive power over the longitudinal undulating planes thereof.

My invention consists, secondly, in the construction and arrangement of cable-gripping mechanism under a car, whereby one or more passenger cars or coaches traveling over the rails of the elevated structure may be readily and effectively attached to and detached from the cables, either automatically or otherwise.

My invention consists, thirdly, of the details of construction and combination of parts hereinafter fully described, and pointed out in the claims.

The nature of my invention will be more fully understood taken in connection with the accompanying drawings, wherein—

Figure 13:
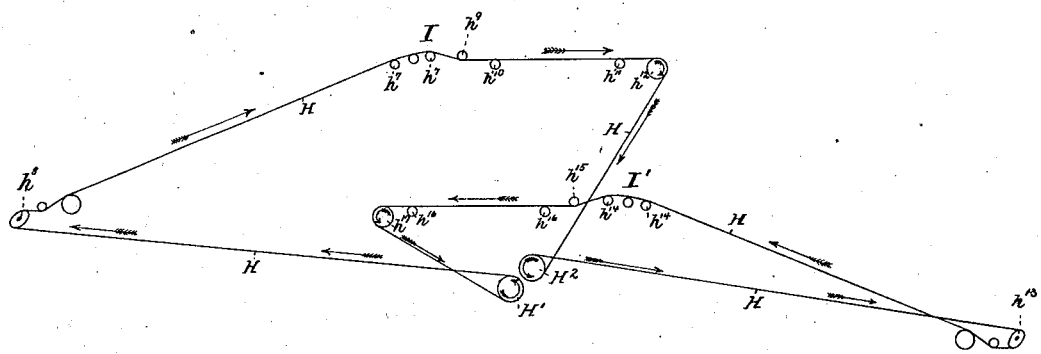
Figure 14:
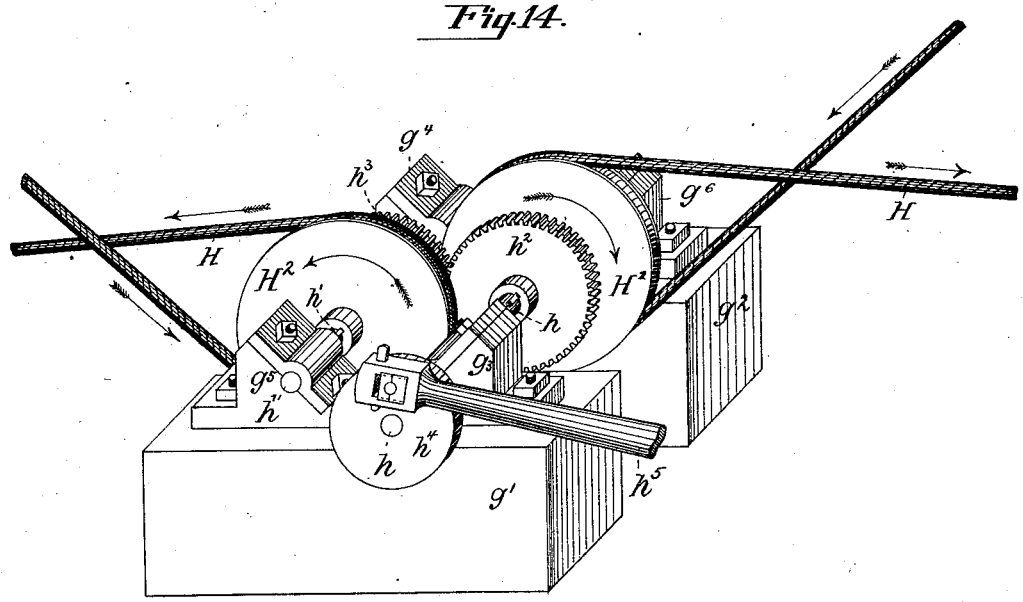

Figure 1 is a longitudinal side elevation showing in three sections my improved double-track elevated gravity and cable railroad, and also a central section of a passenger-station between the outgoing and return courses of the road and with the cable and its actuating mechanism propelled by a steam-engine located beneath the station for propelling a car along the ascending plane of the course. Fig. 2 is a top or plan view of the same. Fig. 3 is a longitudinal side elevation of the starting or terminal stations, showing the table for reversing the car. Fig. 4 is a top or plan view of the same. Fig. 5 is a cross-section of the elevated railroad, showing a section of a station located centrally between the two courses, and also the plant beneath for operating the cable and elevating a car along two of the ascending planes of the railway-course running in opposite directions. Fig. 6 is a transverse section of the elevated railway, showing the metallic supporting-columns and cross-beams and the I-beams and the sleepers for the tracks to rest upon. Fig. 7 represents a top or plan view of the road-bed. Fig. 8 is a transverse sectional view, on an enlarged scale, of one of the railway-courses, showing in broken section a modified form of a supporting metallic column having a cross-beam secured to the same and supported upon a bracket cast therewith, and upon this supporting-column is supported a longitudinal I beam, on which rests the sleepers upon which the rails are secured, and also showing a passenger-car, partly in section and partly in elevation, mounted upon the rails, with gripping mechanism thereunder, and with the safety devices for preventing cars from jumping the rails and obviating accident shown in application. Fig. 9 is a plan view of the cable-grip and automatic mechanism for operating the same. Fig. 10 is a longitudinal view of a passenger-car, partly in elevation and partly in section, showing the grip and mechanism for actuating the same applied thereto. Fig. 11 is a top or plan view of the gripping device, with the jaws thereof open. Fig. 12 is a longitudinal central section of the gripping device on the line $x\ x$ of Fig. 8. Fig. 13 is a diagrammatic view of the directions the cable travels along the outgoing and return courses of the elevated railway; and Fig. 14 is a perspective view of the mechanism located upon a superstructure beneath one of the passenger-stations of the elevated railway, and showing also a portion of the connecting-rod of an engine suitably pinned to a crank.

Referring to the drawings for a further description of my invention, wherein is shown a double-track elevated railway built upon suitable strong trestle-work and representing the outgoing and return courses of the roadway, A represents the foundation into which the supporting-columns of the superstructure are embedded. This superstructure consists of supporting-columns B B, made of wrought or cast iron or other suitable material, and fitted solidly into the bases $b$ and $b$, and these bases embedded in a foundation, A, preferably prepared to receive them. These metallic supporting-columns B and B have upon their upper extremities capitals $b'$, into which are fitted shoes $b^2$, secured thereto by means of bolts $b^3$. Cast or otherwise secured to the exterior surface of the supporting-columns are brackets $b^4$, into which are fitted the cross-beams B', held securely to place therein by means of bolts and nuts $b^5$. In the shoes $b^2$, snugly held in the capitals $b'$ of the supporting-columns B, on each side of the course, is fitted the outer longitudinal I-beam, C; and the inner longitudinal I-beam, C', is held in shoes $b^6$, rigidly secured in any suitable manner to the cross-beams B', or into a vertical strut, $b^7$, bolted to the cross-beam B', as shown in Fig. 6. Upon the lower flanges of the I-beams C and C' of the outgoing and return courses of the structure rest the sleepers D, made of stout material, and between the sleepers D, at suitable distances apart, tie-rods D' are inserted through openings provided in the body of the I-beams C and C' to receive them, and held rigidly thereto by means of nuts $c'$, secured to the threaded ends of the rods D'. Upon the sleepers D the rails $e$, $e'$, $e^2$, and $e^3$ are suitably spiked in any well-understood manner. To the shoes $b^2$ and $b^6$ are secured the truss-chords $C^2$ by means of bolts and nuts $c^2$. The truss-chords $C^2$ are provided with vertical struts $c^3$, which are suitably hinged to the under side of the longitudinal I-beams C and C' and to the respective truss-chords $C^2$. These truss-chords are preferably provided with swivel-nuts $c^4$, located centrally for tightening and binding together longitudinally the several parts of the structure, and for strengthening the longitudinal I-beams C and C' in a similar manner as the tie-rods D' tighten and bind together laterally the several parts of the superstructure.

F represents one of the elevated passenger-stations located along the line centrally between the outgoing and return courses of the road, access to this elevated station being had by means of stairways $f$, so that passengers may take the cars from the elevated station going in either direction—that is to say, either to the "right" or to the "left" of the course. The stations along the line of the railway will be located at suitable distances apart and arranged so that as soon as the car J is released automatically or otherwise from the cable H at the summit of the ascending plane, preferably just to the right or left of the center of the station, according to the direction the car may be going, the brake may be readily operated by the attendant in charge and the car brought to a full stop to receive and discharge passengers. Upon the release of the brake the car will immediately start off and be carried by gravity to a point about central to the station, where the car again settles onto the cable, and the grip coming in contact therewith immediately carries it over a short inclined plane in the roadway, where the grip is again detached from the cable and the car starts off down the descending plane to the foot of the ascending one, whence it is again gripped to the cable and conveyed to the next elevated passenger-station at the summit of the plane, and released from the cable again before the center of the station is reached, and held thereat by the brakeman in charge of the car for receiving and discharging passengers from the car.

Beneath each station F, upon an elevated superstructure of light and durable construction—such, for example, as that shown in Figs. 1 and 5—consisting of supporting-columns $B^3$ and $B^4$, to which cross-girders $D^4$ are secured, is laid a floor or platform, $D^5$, firmly held thereto in a suitable manner. Upon this platform is placed a plant consisting of a steam or other motive-power engine, G, for imparting motion to the cable H for conveying the cars up the ascending planes in both directions. The elevated platform upon which the steam or other motive-power engine G is placed may be either an open or an inclosed superstructure, and so arranged that access thereto may be had by one of the stairways $f$ leading to the elevated passenger-station. The driving-engine G is preferably mounted upon a base, $g$, rigidly secured to the floor. Upon this platform $D^5$ are rigidly secured two standards, $g'$ and $g^2$, provided with journal-bearings $g^3$, $g^4$, $g^5$, and $g^6$, into which the shafts $h$ and $h'$, carrying the frictional driving-wheels H' and H², are journaled, and to which shafts $h$ and $h'$ are rigidly secured gear-wheels $h^2$ and $h^3$, meshing with each other.

Rigidly secured to one end of the shaft $h$ is a crank, $h^4$, to which the piston connecting-rod $h^5$ of the engine is pivoted. Motion is imparted by the engine G to the crank $h^4$, which imparts motion to the shaft $h$, actuating the gear-wheels $h^2$ and $h^3$, and driving the frictional wheels H' and H², carrying the cable H along over the frictional drum $h^6$, and backward in a horizontal direction between the tracks $e$ and $e'$ of the ascending plane, guided by a series of grooved rollers, $h^7$, suitably journaled in the superstructure in a manner similar to that shown in Fig. 7, where, at the summit of the ascending-plane I, the cable takes a slight downward course under the roller $h^9$, suitably journaled in the trestle-work, and thence over guide-rollers $h^{10}$ and $h^{11}$, the journals of these guide-rollers $h^{10}$ and $h^{11}$ being held in bearings provided for them between the tracks $e$ and $e'$. The cable then passes around the friction-pulley $h^{12}$ and backward around the frictional driving-wheel H², thence passing over the frictional drum-pulley $h^{13}$, and backward in a horizontal direction between the tracks $e^2$ and $e^3$ of the ascending plane of the opposite course along over the guide-rollers $h^{14}$, where, at the point I', the cable H passes downward over a series of guide-rollers, $h^{15}$ and $h^{16}$, thence around the drum $h^{17}$, and thence continuing downward and around the frictional driving-wheel H', thereby completing the circuit. It will thus be seen that by such an arrangement of cable-operating mechanism the passenger cars or coaches traveling over the ascending longitudinal planes of the course in opposite directions may be readily and effectively operated by a single plant located beneath the stations F at suitable distances apart.

It will be observed that the cable H is so arranged as to travel between the tracks $e\ e'$ and $e^2\ e^3$ in opposite directions upon guide-rollers at suitable distances apart and suitably journaled to the trestle-work, and a sufficient distance above the road-bed for the gripping mechanism provided under each car, by preference, to automatically grip the cable, and at the summit of the incline plane to become disengaged therefrom, so that when the car reaches the station to receive or discharge passengers it will have reached a point in the road where the descent is by gravity alone, and hence it will be readily stopped by the attendant in charge operating the brakes, so that when the brakes are released the car will immediately start off and be carried by gravity alone over the descending plane to the foot of the ascending plane, where the car will be conveyed to the summit of the incline by means of another cable, operating in a similar manner as the one already fully explained, and hence it will be seen that such an elevated railway may be constructed of any length.

It will be understood that the cars will not descend the planes at what might be termed a "dangerous" speed, but at a rate, say, from ten to twelve miles an hour, (more or less,) according of course to the way the road is constructed, but, however, so constructed and arranged that safety at all times will be insured, which will be manifestly obvious from the further description of the invention, taken in connection with the passenger-cars proposed for use thereon, provided thereunder with safety devices and with gripping mechanism operating either automatically or otherwise.

The starting or terminal station W of the elevated railway is shown in Figs. 3 and 4. This elevated structure may be of any suitable construction, either open or inclosed, with waiting-rooms on each side of the course, and with a turn-table, V, in the center between the waiting rooms, for reversing the cars J to change their course, access to these elevated stations being had by means of stairways $w$. The railway is so arranged near the terminal station that the car will acquire sufficient momentum by gravity to carry it over the summit $w'$ of the plane and onto the turn-table V, only to be started off down the descending plane $w^2$ upon the release of brakes of the car J by the attendant in charge, as will be fully understood by reference to Figs. 3 and 4 of the drawings.

In Fig. 10 is shown a passenger car or coach, J, of a construction suitable for use on an elevated railway, embracing the special features of my invention. This car J is provided inside with seats for the passengers, on each side, and with an aisle extending through the center thereof, and the car mounted upon front and rear trucks, $j$ and $j'$, of the usual well-known construction, save that the bolsters of the trucks (secured centrally to the car floor by means of king-bolts or otherwise) project in both directions laterally from the center thereof beyond the car-wheels. These bolsters are made of very strong or stout material and serve as safety devices, in case an axle should break, to avoid accident, by their contact with the longitudinal I beams C and C' on both sides of the course, as will be readily understood by reference to Fig. 8.

To the under side of the rear truck of each car J is provided a frame-work, L, consisting of three transverse beams, $l$, and four longitudinal beams, $l'$, suitably secured together and rigidly fastened to the truck. Through the center of this frame is provided two longitudinal guideways, $l^2$ and $l^3$, made of any suitable material, and rigidly secured to the transverse beams $l$, and along said supporting-guideways $l^2$ and $l^3$ the respective metallic gripping-jaws, $m$ and $m'$, U-shaped in cross-section, as shown in Fig. 8, are made to slide backward and forward. These jaws $m$ and $m'$ are provided with brackets forming tongues, to which are attached lever-arms $m^2$ and $m^3$ by means of bolts $m^4$ and nuts $m^5$, and the opposite extremities of these lever-arms are secured to T-shaped brackets $m^6$ and $m^7$, secured to the longitudinal beams $l'$ by means of bolts $m^8$ and nuts $m^9$, and for regulating the longitudinal movement of the gripping-jaws along over the guideways $l^2$ and $l^3$. To the rear extremities of the jaws $m$ and $m'$ are secured, by means of rivets $m^{10}$, or otherwise, two longitudinal arms, $m^{11}$ and $m^{12}$. These longitudinal arms $m^{11}$ and $m^{12}$ are hinged to an arm having a U-shaped extremity, $m^{13}$, by means of a stout bolt and nut, $m^{14}$, as shown in Fig. 12, forming a knuckle-joint. This arm $m^{13}$ carries a fixed collar, $m^{15}$, and coiled around this arm is a retracting-spring, $m^{16}$, which abuts against the fixed collar $m^{15}$, and its opposite end extremity against the vertical depending beam $m^{17}$, rigidly secured to the under side of the rear platform of the car J. The tie-rod $n$ is provided with oppositely-projecting ends $n'$ and $n^2$, which are secured, respectively, to the depending arm $m^{17}$ and the cross-beam $l$, thereby rigidly holding the depending arm $m^{17}$ in position beneath the rear platform of the car. The depending arm $m^{17}$ has bolted to it a T-shaped bracket, $m^{18}$, with double tongues, to which the connecting-arm $n^3$ is fulcrumed, and this arm is secured at one extremity by means of a bolt, $n^4$, to the arm $m^{13}$, and at its opposite extremity, by means of a bolt, $n^5$, to a longitudinal lever-arm, $n^{12}$, suitably supported under and extending the entire length of the car, and which is bolted to an eccentric, $n^6$, rigidly attached, beneath the front platform, $j^3$, of the car, to the vertical depending rod $n^7$, held in bearings $n^8$ and $n^9$, provided therefor. This depending rod $n^7$ is provided with a ratchet-wheel, $n^{10}$, which rests upon the platform, and in close proximity thereto is provided a pawl, $n^{11}$, pinned to the platform. This pawl $n^{11}$ is called into action when necessary by the foot of the brakeman in charge of the car, for engaging the ratchet-wheel $n^{10}$ and holding the depending rod $n^7$ in a certain fixed position.

To the lower extremity of the vertical depending rod $n^7$ is rigidly secured a dog, $o'$. To the road-bed at the point where the cable comes in contact with the gripping device under the car J, and parallel with the rails, is provided a strong stout longitudinal timber, O, as shown in Figs. 2 and 8, and a similar timber, O, at the summit of the incline-plane leading to the passenger-station F.

It will of course be understood that the jaws of the gripping device are always normally closed by the retracting - spring $m^{16}$, coiled around the longitudinal arm $m^{13}$, and hence it is necessary from this fact to open them at the proper time to grip the cable, and this is automatically accomplished by means of the dog $o'$ coming in contact with a vertical projecting stout longitudinal timber, O, secured rigidly to the road-bed in a line parallel with one of the tracks. This dog $o'$ is moved in the direction indicated by the arrow in Fig. 9, turning the eccentric $n^6$ and moving the horizontal lever-arm $n^{12}$, extending the entire length of the car forward, actuating the fulcrumed connecting-rod $n^3$, hinged to the horizontal arm $m^{13}$, (having the retracting-spring $m^{16}$ coiled around it and compressing the same,) and operating the two lever-arms $m^{11}$ and $m^{12}$, hinged thereto and to the jaws $m$ and $m'$ of the gripping device, thereby opening the jaws to receive the cable. At the forward end of the timber O the dog $o'$ returns to its normal position, with the cable firmly gripped between the jaws $m$ and $m'$, and as fully shown in Figs. 9, 10, 11, and 12.

To the cross-timber bars $l$ and $l^4$ of the front and rear trucks, $j$ and $j'$, of the car, Fig. 10, are attached brackets $n^{13}$, to which grooved guide-pulleys N and N' are suitably held in bearings provided therefor in these brackets. These guide-pulleys N and N' serve to guide the cable in a straight course beneath the car and prevent the cable from coming into contact with the trucks or axles of the car-wheels and damaging the same by such a frictional contact therewith.

Along the ascending planes of the road-bed, parallel with the rails, are run wooden plain-surfaced rails U and U', and to the horizontal beams $l'$ of the gripping frame-work L are suitably attached locking-dogs $u$ and $u'$. These dogs are so arranged that they automatically act only in case the cable should from any cause fail to take hold of the car-grip in ascending one of the planes, and thus take a retrograde movement. This is obviated and the car quickly and effectively stopped by the dogs $u$ and $u'$ ploughing into the rails U and U', provided in the road-bed for that purpose, thereby affording the means by which accident may be prevented and the safety of the passengers riding over the railway insured.

It will of course be understood that each car is provided with suitable brake mechanism, operated by a hand - wheel from the front platform, $j^3$, of the car, for stopping the same *ad libitum*, but which has not been shown in the drawings, because so well understood as to need no illustration or description.

While I have shown and described my invention with special reference to its use in cities as a means of rapid transit, it is nevertheless manifestly obvious that the invention is equally applicable to and susceptible of being used with practical success at seaside and other resorts as a means of pleasure and amusement, by simply shortening the course, so that a car starting from an elevated station may descend a longitudinal plane by gravity, only to be conveyed by means of a cable to the summit of an ascending plane, whereupon the car may be permitted to descend by gravity again to a terminal station, and upon the reversal of the car at that point on a suitable turn-table, such as hereinbefore mentioned, the car may be again returned to the starting-point for another trip.

Having thus described the nature and objects of my invention, what I claim as new, and desire to secure by Letters Patent, is—

1. In an elevated gravity and cable railway, the combination, with longitudinal beams and cross-ties supported upon said beams, of brace-rods passing through and secured to said longitudinal beams, substantially as and for the purposes set forth.

2. An elevated gravity and cable railway provided with vertical supporting-columns and cross-beams supported thereby, and vertical struts supported upon said cross-beams, in combination with I-beams and shoes for holding said beams in position in said columns, struts, and cross-beams, sleepers abutting against the inside flanges of said I-beams, and tie-rods passing through and secured to said I-beams, whereby said sleepers are held firmly in position, substantially as described.

3. In an elevated gravity and cable railway, the combination, with vertical supporting-columns provided with capitals and cross-beams supported in brackets secured to said columns, of longitudinal I-beams suitably supported thereupon, adjustable truss-chords and vertical struts secured, respectively, to the capitals of said supporting-columns and said longitudinal I-beams, sleepers abutting against the inside flanges of the respective I-beams, and tie-rods passing through said beams and securely held thereto by means of nuts, substantially as and for the purposes set forth.

4. In an elevated gravity and cable railway, the combination, with cables and motive power, arranged substantially as described, for propelling the same, of a car provided with a gripping device, and mechanism, substantially as described, for actuating the same, as and for the purposes set forth.

5. An elevated gravity and cable railway, in combination with a car provided with a gripping device operating automatically, a cable, and motive power, arranged substantially as described, to elevate simultaneously cars traveling in opposite directions, substantially as and for the purposes set forth.

6. An elevated gravity and cable railway provided with a series of descending and ascending longitudinal planes, a car having a gripping device and means for automatically actuating said device, a cable, and a steam-engine, arranged substantially as described, to propel cars traveling in opposite directions to the summits of the ascending planes, substantially as and for the purposes set forth.

7. An elevated gravity and cable railway, constructed substantially as described, with a series of descending and ascending planes and with turn-tables at the starting and terminal stations, in combination with a car provided with a gripping device and means for operating the same, and with front and rear bolsters projecting beyond the wheels of said car, substantially as and for the purposes set forth.

8. An elevated gravity and cable railway, substantially as described, in combination with a car provided with a gripping device and mechanism, substantially as shown and described, for opening and closing the jaws thereof, means for preventing the car from running backward down an incline, a cable, and steam-engine for propelling the same, substantially as and for the purposes set forth.

9. An elevated gravity and cable railway, substantially as described, in combination with a car provided with front and rear trucks, a gripping device secured to the rear truck and means for opening and closing automatically the jaws of said device, a device secured to said trucks for preventing the car jumping the rails, guide pulleys secured to said trucks for directing the cable in a straight course beneath said trucks, and laterally-projecting bolsters, all arranged substantially as and for the purposes set forth.

10. An elevated gravity and cable railway constructed with descending and ascending planes, whereby a car may be alternately carried by gravity and propelled by a cable actuated by suitable motive power from power-furnishing stations along the line of and connected with said elevated structure, in combination with a car provided with a gripping device, substantially as described, and with means whereby the same may be operated automatically, and devices, substantially as described, for preventing the car from jumping the tracks and for preventing the retrograde movement thereof, substantially as and for the purposes set forth.

In witness whereof I have hereunto set my hand in the presence of two subscribing witnesses.

LA MARCUS A. THOMPSON.

Witnesses:
THOMAS M. SMITH,
HERMANN BORMANN.